United States Patent [19]
Kobayashi et al.

[11] Patent Number: 5,847,792
[45] Date of Patent: Dec. 8, 1998

[54] ACTIVE MATRIX TYPE LIQUID CRYSTAL DISPLAY PANEL AND PROJECTION TYPE DISPLAY DEVICE WITH LIGHT SHIELDING FILM FORMED ON TOP OF ACTIVE DEVICES AND BETWEEN PIXEL ELECTRODES

[75] Inventors: Tetsuya Kobayashi; Toshihiro Suzuki; Takeshi Gotoh; Hisashi Yamaguchi; Kazutaka Hanaoka; Yasutoshi Tasaka; Seiji Tanuma; Makoto Ohashi; Takashi Sasabayashi; Yohei Nakanishi, all of Kanagawa, Japan

[73] Assignee: Fujitsu Limited, Kawasaki, Japan

[21] Appl. No.: 730,100

[22] Filed: Oct. 15, 1996

[30] Foreign Application Priority Data

Dec. 27, 1995 [JP] Japan ................................ 7-340336

[51] Int. Cl.$^6$ .......................... G02F 1/1335; G02F 1/136; G02F 1/1333
[52] U.S. Cl. .......................... 349/110; 349/44; 349/106; 349/8
[58] Field of Search ................................ 349/8, 106, 110, 349/44

[56] References Cited

U.S. PATENT DOCUMENTS

| | | | |
|---|---|---|---|
| 5,295,005 | 3/1994 | Nishida et al. | 349/8 |
| 5,358,810 | 10/1994 | Yoshino | 349/106 |
| 5,368,991 | 11/1994 | Uchikawa et al. | 349/106 |
| 5,680,187 | 10/1997 | Nagayama et al. | 349/110 |

OTHER PUBLICATIONS

T. Yamanaka, T. Fukunaga, T. Koseki, K. Nagayama, T. Ueki—Integrated Black Matrix on TFT ArraysSID '92 Digest, pp. 789–792.

G. Kawachi, E. Kimura, Y. Wakui, N. Konishi, Y. Matsukawa, H. Yamamoto, and A. Sasano—A Novel Technology for a–Si TFT–LCD's with Buried ITO Electrode (BI) Structure Japan Display '92, pp. 635–638 (1992).

N. Takahashi, Y. Hirai, S. Kaneko, K. Nakashima, O. Sukegawa—A High–Aperture–Ratio Pixel Structure for High–Density a Si TFT Liquid–Crystal Light Valves—SID '93 Digest, pp. 610–613 (1993).

T. Ueda, J. Sugahara, H. Toeda, M. Akiyama, M. Ikeda, and K. Suzuki ; A High–Aperture–Ratio TFT–LCD with a Shield–Electrode Structure SID '93 Digest, pp. 739–742 (1993).

Primary Examiner—William L. Sikes
Assistant Examiner—Julie Ngo
Attorney, Agent, or Firm—Greer, Burns, & Crain, Ltd.

[57] ABSTRACT

An active matrix type liquid crystal display panel comprises a first substrate having a plurality of active devices, a plurality of scanning bus lines, a plurality of data bus lines, and a plurality of pixel electrodes, a second substrate having opposed electrodes on its surface opposing to the first substrate, a first shielding film formed on top of the active devices and between the pixel electrodes on the first substrate, a second shielding film formed in at least areas opposing to semiconductor regions of the active devices on the second substrate, and liquid crystals sealed between the first substrate and the second substrate.

34 Claims, 18 Drawing Sheets

→ rabbing
-----→ direction

ACTIVE MATRIX TYPE LIQUID CRYSTAL DISPLAY PANEL AND PROJECTION TYPE DISPLAY DEVICE WITH LIGHT SHIELDING FILM FORMED ON TOP OF ACTIVE DEVICES AND BETWEEN PIXEL ELECTRODES

BACKGROUND OF THE INVENTION

1. Field of the Invention

The present invention relates to an active matrix type liquid crystal display panel and a projection type display device and, more particularly, an active matrix type liquid crystal display panel in which shielding films are arranged around pixel regions and a projection type display device which is equipped with the liquid crystal display panel.

2. Description of the Prior Art

A liquid crystal display panel is being used in a front or back projection type display called a liquid crystal projector, etc.

When using the liquid crystal display panel, in order to increase luminance of magnified projection images, a strong light must be irradiated into a liquid crystal panel rather than a direct-view type liquid crystal panel. Besides, transmittance of the liquid crystal panel must be enhanced, and therefore a configuration having large aperture efficiency must be adopted. The aperture efficiency is defined as a ratio of an effective display area to a pixel unit area.

In a plan view of FIG. 1A and sectional views of FIGS. 2A and 2B, an example of a configuration of a pixel region of an active matrix type liquid crystal display panel is shown.

The liquid crystal display panel has a configuration wherein a liquid crystal 103 is put between a TFT substrate 101 and a common substrate 102. Thin film transistors (referred to as TFTs hereinafter) 104, gate bus lines 105, data bus lines 106, and transparent 35 pixel electrodes 107 are formed on a surface of the TFT substrate 101 in the liquid crystal 103 side. The gate bus lines 105 are connected to gate electrodes 104g of the TFTs 104, the data bus lines 106 are connected to drains 104d of the TFTs 104, and the pixel electrodes 107 are connected to sources 104s of the TFTs 104. In addition, common electrodes 108 made of transparent conductive material are formed on a surface of the common substrate 102 in the liquid crystal 103 side.

A gate voltage Vg is applied to the gate bus lines 105 to turn on/off the TFTs 104. A data voltage Vd is applied to the data bus lines 106 to control optical transmittance of the liquid crystal 103.

If the gate voltage Vg applied to the gate bus lines 105 is at on level, the TFTs 104 are turned on and thus the data voltage Vd is applied to the pixel electrodes 107. Usually optical transmittance of the liquid crystal 103 sealed between the common substrate 102 and the pixel electrodes 107 is determined depending upon voltage difference between these electrodes, i.e., difference between common voltage Vc and data voltage Vd.

When the gate voltage Vg applied to the gate bus lines 105 reaches on level, the TFTs 104 are turned off. As a result, pixel voltage which is written when the gate voltage Vg is at on level is held until succeeding turn-on of the TFTs 104.

Since a strong light is irradiated from a light source to the active matrix type liquid crystal display panel, in particular, active matrix type liquid crystal display panel for use in the liquid crystal projector, two problems arise as follows.

As a first problem, when the light is irradiated to the TFTs 104 in the liquid crystal display panel, desired display may not be implemented since the TFTs 104 are changed into their on state because of photoelectric effect even if the TFTs 104 are in off state and then voltage of the pixel electrodes 107 cannot be held. Accordingly, light leakage occurs in the liquid crystal display panel.

As a second problem, light leaks out from regions other than the pixel electrodes 107. Since the TFT 104, two bus lines 105, 106, as explained above, together with the pixel electrode 107 are arranged in one pixel region, usually a space such as about 5 μm is caused around the pixel electrodes 107. Therefore, light leaks out from the region between the pixel electrode 107 and two bus lines 105, 106 and the region between the TFT 104 and the pixel electrodes 107 to cause display contrast to lower.

In order to overcome theses problems, as shown in FIGS. 2A and 2B, metal thin film patterns are formed on the common substrate 102. In other words, shielding metal patterns 109 are formed around the pixel electrode 107 on a surface of the common substrate 102 in the liquid crystal 103 side. Such metal patterns 109 are in general called a black matrix.

For easy understanding, an insulating film is entirely omitted in the plan view of FIG. 1.

However, in the liquid crystal display panel with the black matrix, an alignment margin such as about 5 μm is needed upon laminating peripheral portions of the common substrate and the TFT substrate by adhesive agent.

In other words, even if lamination between the TFT substrate 101 and the common substrate 102 is displaced relatively by about 5 μm, peripheries of the pixel electrodes 107 must be shielded.

Hence, as shown in FIG. 2B, the black matrix 109 must be expanded to extrude inwardly from peripheries of the pixel electrodes 104 by about 5 μm as the alignment margin $W_{10}$, and therefore this causes the aperture efficiency to reduce.

For this reason, two configurations wherein the black matrix is formed on a surface of the TFT substrate 101 have been proposed.

In a first configuration, as shown in FIG. 3, a metal black matrix is formed around the pixel electrode 107 via an insulating film. According to this configuration, since the insulating film and the metal black matrix constitute part of parasitic capacitor, the bus lines 105, 106 and the pixel electrode 104 are connected via the parasitic capacitor. Since the pixel voltage is influenced by bus voltage via the parasitic capacitor, such a problem occurs that crosstalk is caused. In this case, since the metal black matrix is designed thick like several hundreds nm to suppress light transmittance less than 0.01%, it has low resistance to thus result in increased influence of parasitic capacitance. It is preferable to suppress transmittance below 0.01% because the light incident into the liquid crystal display panel is large like about one million lux in the liquid crystal projector.

In a second configuration, as shown in FIG. 3, the black matrix 110 formed on the TFT substrate 101 is made of black resin in place of metal. It is possible to form such black resin by applying the technique for forming a color filter on the common substrate 102 of the direct-view type liquid crystal display panel. In this event, parasitic capacitance between the bus lines 105, 106 and the pixel electrode 107 is in no means increased because the black resin exhibits high resistance.

However, since the black resin has large light transmittance like 1% against the incident light, the light transmitted through the black resin is incident into the TFTs to therefore cause the TFTs to generate leakage current. In addition, if the black resin is formed thick, the temperature of the liquid crystal panel is increased due to absorption of the light from the light source. As a result, transistor characteristics of the TFT are deteriorated and the liquid crystal characteristics are varied.

Moreover, since a step caused between edge of the black resin and the pixel resin 107 becomes about 1 μm if a thickness is set to about 1 μm to enhance light shielding effect of the black resin, alignment of molecules of the liquid crystal is disturbed. Consequently, upon applying the voltage, raising direction of molecules of the liquid crystal is reversed in a central region of the pixel electrode 107 and an edge portion of the black resin. In this manner, it is noted as inversely tilted domains that molecules of the liquid crystal is directed inversely to a central portion of the pixel electrode 107.

Such inversely tilted domains are not caused in all steps around the pixel electrodes, but they are prone to be caused in partial steps around the pixel electrodes. For instance, as shown by a chain line in FIG. 3, they are easy to occur at rear portions of the steps caused between the black matrix 110 and the pixel electrodes 107 in the rubbing direction. A reference 111 denotes an alignment film to cover the black matrix 110 and the pixel electrodes 107.

As explained above, once the inversely tilted domains are caused, display contrast is reduced because the light leaks out from boundaries between normal regions and the inversely tilted domains.

SUMMARY OF THE INVENTION

The present invention has been made in view of such problems, and an object thereof is to provide an active matrix type liquid crystal display device and a projection type display device capable of, while reducing parasitic capacitance when a black matrix is formed on the TFT substrate side, suppressing increase in leakage current in TFTs and also preventing light leakage because of inversely tilted domains.

According to an aspect of the present invention, areas between the pixel elements are covered by the first shielding films on the active device substrate while the second shielding films are formed at least in areas opposing to semiconductor regions of the active devices on the common substrate. Thereby, pixels located at peripheries of the active devices are covered by the second shielding film as the margin for lamination of the substrates, while the pixel electrodes located in remaining regions are covered by the first shielding film as the pattering margin. Therefore, the aperture efficiency can be increased rather than the prior art. Since the active devices are shielded firmly at least by the second film, leakage current due to photo-electromotive force can be suppressed in the active devices.

Since the first shielding film on the active device substrate side is formed of black resin, white resin, etc., no problem of parasitic capacitance and light leakage occurs.

In addition, since the light incident into the liquid crystal display panel is reflected if the first shielding film is formed of white resin or thin metal film, excessive heating of the first shielding film can be avoided since an amount of light absorption in the first shielding film is lessened. Thus degradation of the liquid crystal display panel can be suppressed.

In the present invention, since the first shielding film formed on the active device substrate is formed of color resin with high reflection factor, increase in the temperature of the liquid crystal display panel can be suppressed because of small light absorption. Reflection factor of the color resin can be enhanced if a particle diameter of red, blue, or green pigment included in the color resin is set to 0.1 to 0.5 μm. If, upon incorporating the panel using color resin as the shielding layer into the projector, the shielding layer is so colored that resin colors in respective liquid crystal display panels which receive red, blue, and green, i.e., three primary colors separated from white light emitted from the light source, are identical to those of received lights, lights of respective colors are reflected by the resin layers and not absorbed therein. As a result, increase in the panel temperature can be prevented and sufficient shielding effect can be implemented.

Furthermore, if the first shielding film is formed as the multilayered structure consisting of an upper reflection layer and a lower black resin layer, an reflection amount of the light can be increased whereas an absorption amount of the light can be reduced.

According to another aspect of the present invention, since only such areas of the pixel electrodes wherein the inversely tilted domains are apt to be caused are covered by the second shielding film formed on the common substrate and remaining areas are covered by the first shielding film formed on the active device substrate, generation of the inversely tilted domains can be prevented. In addition, by forming the first shielding film including the less patterning margin, the aperture efficiency can be increased rather than the prior art.

The active matrix type liquid crystal display panel of the present invention may be applied to the liquid crystal projector or direct-view type liquid crystal display panel, and is capable of achieving higher reliability and displaying images with higher luminance.

DESCRIPTION OF THE PREFERRED EMBODIMENTS

Therefore, embodiments of the present invention will be explained with reference to accompanying drawings hereinafter.

(First Embodiment)

Figure 4A:
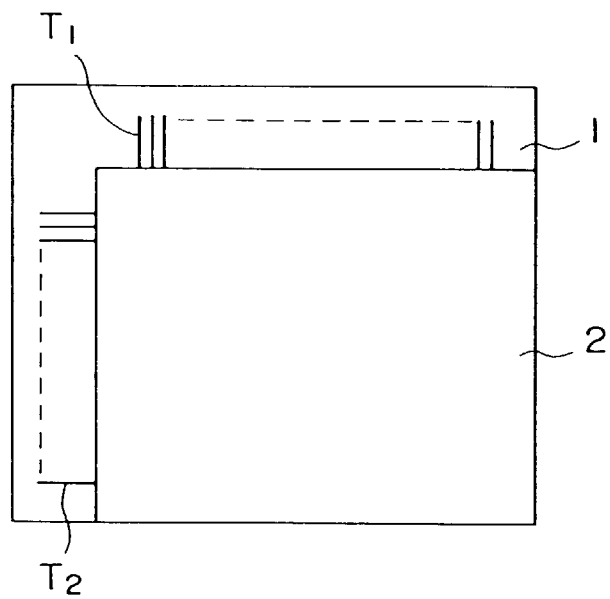
FIG. 4A is a plan view showing an active matrix type liquid crystal display panel according to a first embodiment of the present invention.
Figure 4B:
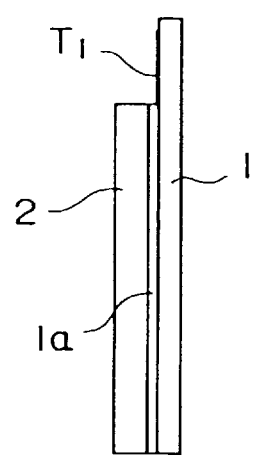
FIG. 4B is a side view showing the active matrix type liquid crystal display panel in FIG. 4A.
Figure 5:
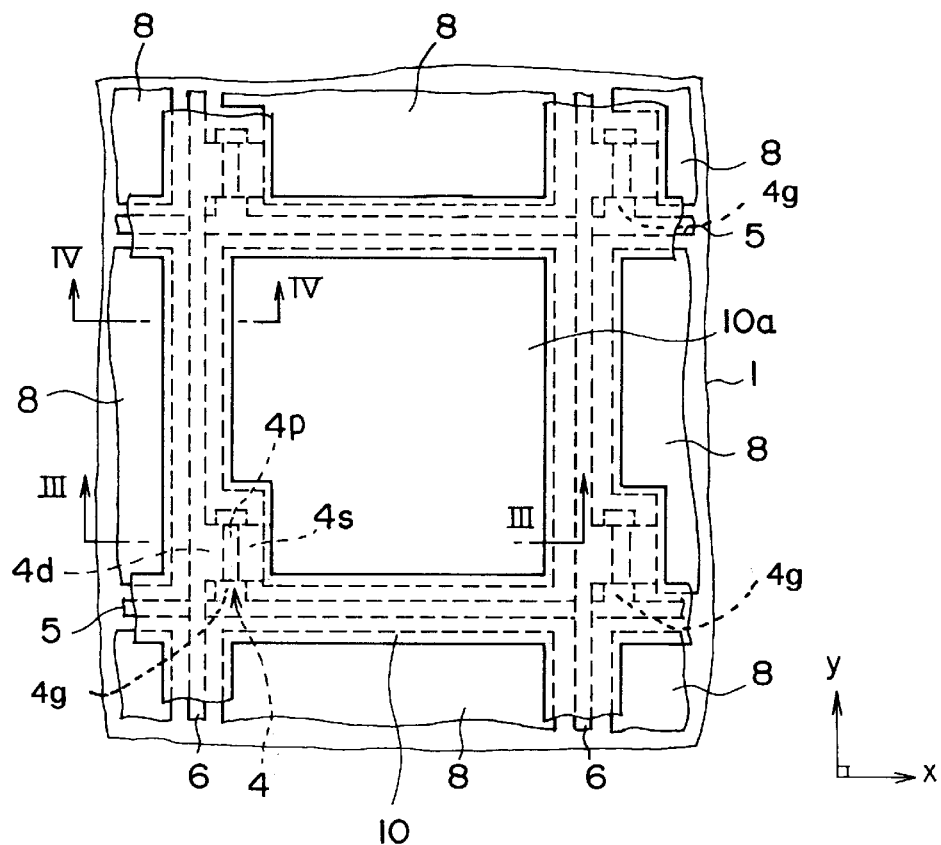
FIG. 5 is a plan view showing one pixel region of a TFT substrate in the active matrix type liquid crystal display panel according to the first embodiment of the present invention.
Figure 6:
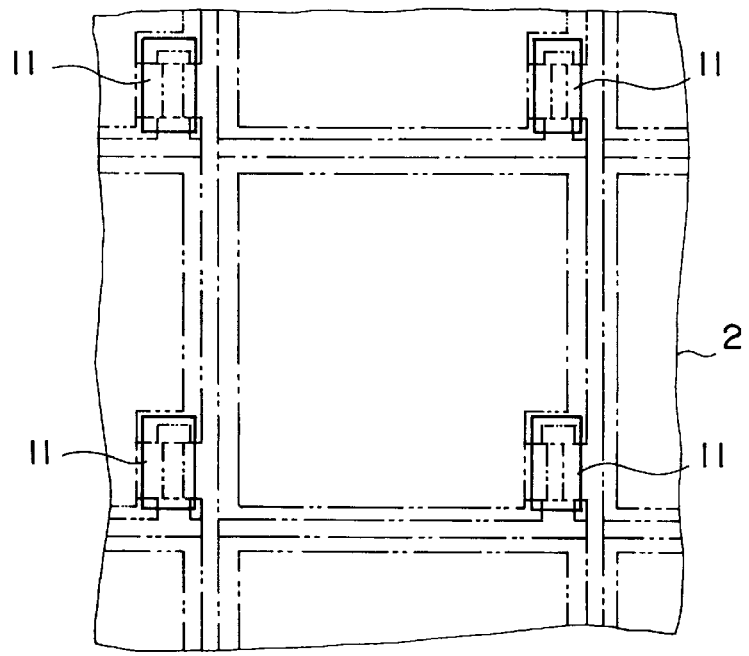
FIG. 6 is a plan view showing one pixel region of a common substrate in the active matrix type liquid crystal display panel according to the first embodiment of the present invention.
Figure 7A:
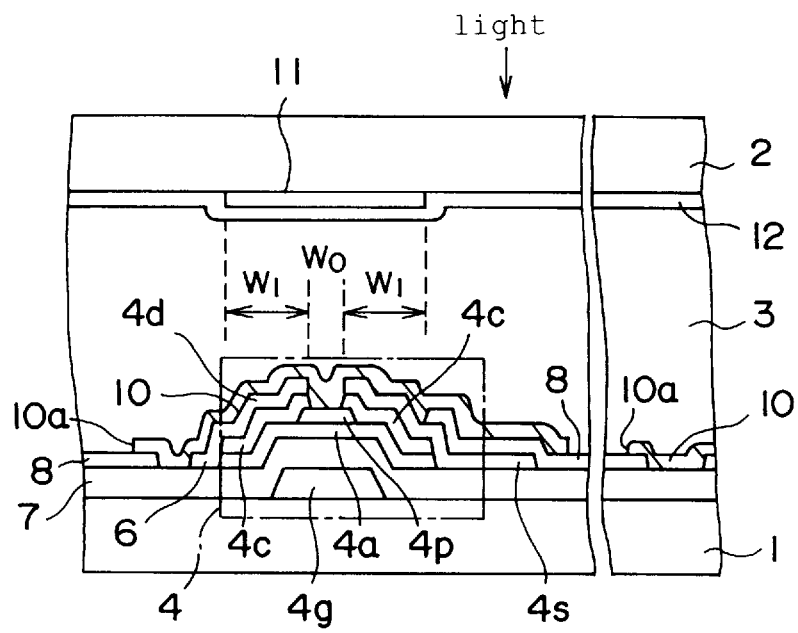
FIG. 7A is a sectional view showing the liquid crystal display panel in FIG. 5 taken along line III—III.
Figure 7B:
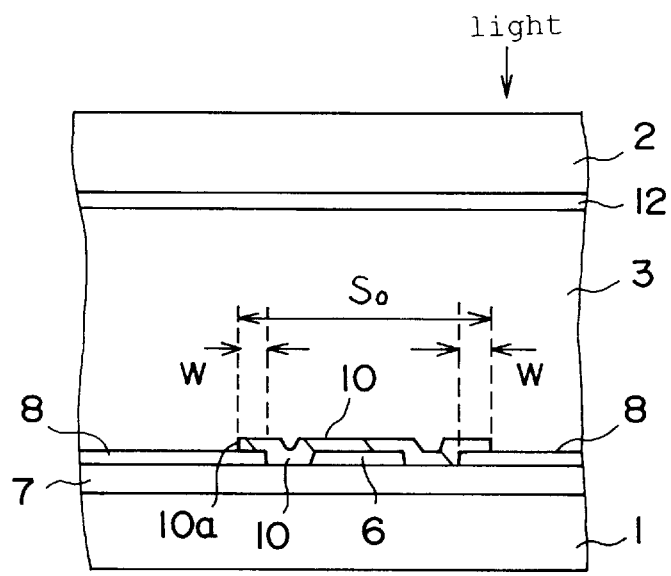
FIG. 7B is a sectional view showing the liquid crystal display panel in FIG. 5 taken along line IV—IV.

FIG. 4A is a schematic plan view showing an overall appearance of an active matrix type liquid crystal display panel according to a first embodiment of the present invention. FIG. 4B is a side view showing the active matrix type liquid crystal display panel in FIG. 4A. FIG. 5 is a plan view showing one pixel region of a TFT substrate in the active matrix type liquid crystal display panel according to the first embodiment of the present invention. FIG. 6 is a plan view showing one pixel region of a common substrate in the active matrix type liquid crystal display panel according to the first embodiment of the present invention. FIG. 7A is a sectional view showing one pixel region of the liquid crystal display panel. FIG. 7B is a sectional view showing boundary regions between the pixel electrodes.

In the liquid crystal display panel according to a first embodiment of the present invention, peripheral portions of a TFT substrate 1 and a common substrate 2 are laminated by adhesive agent via a spacer 1a, as shown in FIGS.4A and 4B, and then a liquid crystal 3 is sealed between the TFT substrate 1 and the common substrate 2, as shown in FIGS.7A and 7B. On the TFT substrate 1, gate bus terminals T1 connected to gate bus lines (scanning bus lines) 5 described later and data bus terminal T2 connected to data bus lines 6 described later are exposed.

The TFT substrate 1 is 3.2 in on the diagonal, the number of pixel is 640×480, and the pixel pitch is 100×100 $\mu$m.

Subsequently, a configuration of one pixel region of the liquid crystal panel will be explained.

As shown in FIG. 5, on the TFT substrate 1 made of glass or the like, plural gate bus lines 5 are formed in parallel at a distance and plural data bus lines 6 are formed in the direction intersecting with the gate bus lines 5. In FIG. 5, the gate bus lines 5 extend in the x direction and the data bus lines 6 extend in the y direction.

The TFTs 4 are formed near intersecting areas of the gate bus lines 5 and the data bus lines 6.

The TFTs 4 have the structure explained hereinafter.

As shown in FIGS.5 and 7A, gate electrodes 4g of the TFTs 4 are formed of the same metal film as the gate bus lines 5, for example, chromium film. An insulating film 7 made of $SiO_2$ is formed on the gate electrodes 4g and the gate bus line 5 and the TFT substrate 1. The insulating film 7 serves as the gate insulating film on the gate electrodes 4g. The gate bus lines 5 and the gate electrodes 4g are made from the same Cr film.

Operation semiconductor layers 4a made of silicon are formed on the gate electrodes 4g via the insulating film 7. In addition, protection films 4p made of $SiO_2$ or the like are formed in the central area of the operation semiconductor layers 4a. The protection films 4p may have light transmittance.

Contact layers 4c made of n type silicon, for instance, are formed on the operation semiconductor layers 4a on both sides of the protection films 4p. On one sides of the contact layers 4c is formed drain electrodes 4d which are connected to the data bus lines 6 and which are formed by patterning the same metal film, for example, Cr film, as the data bus lines 6. The data bus lines 6 are formed on the insulating film 7 to be isolated from the gate bus lines 5.

Source electrodes 4s made of, e.g., Cr film, are formed on the other sides of the contact layers 4c. On the insulating film 7 located in areas surrounded by the gate bus lines 5 and the data bus lines 6, pixel electrodes 8 are formed to be separated from the gate bus lines 5, the data bus lines 6 and the TFTs 4 respectively by a distance of about 5 μm. Part of the pixel electrodes 8 are connected to the source electrodes 4s. The pixel electrodes 8 are made of transparent conductive material, for instance, ITO.

In areas on the pixel electrodes 8 protruding inwardly from edges of the pixel electrodes 8 by almost 2 μm and areas between the pixel electrodes 8 on the TFT substrate 1, first shielding films 10 made of black resin having a thickness of about 1 μm are formed to cover the TFTs 4, the gate bus lines 5 and the data bus lines 6. In other words, opening portions 10a are formed in the first shielding film 10 to expose the pixel electrodes 8, and the opening portions 10a provide respectively patterning margin W of about 2 μm to prevent protrusion from the pixel electrodes 8. Symbol So is a shielding region.

The black resin is composed of acrylic resin, for example, in which black pigment made of carbon is scattered, and is formed to have a thickness of about 0.5 μm.

In contrast, as shown in FIGS.6 and 7A, in areas of the common substrate 2 made of glass opposing to the TFTs 4, second shielding films 11 made of chromium film, aluminum film, metal film having multilayered structure, for example, are formed to have a thickness of 300 nm. Light transmittance of the second shielding films 11 is less than 0.01%. As shown in FIG. 7A, the second shielding films 11 are formed on areas $W_0$ between the source electrodes 4s and the drain electrodes 4d and substrate alignment margins $W_1$. The substrate alignment margin $W_1$ is set to about 0.5 μm, for example. On the surface of the common substrate 2 on which the second shielding films 11 are formed, opposed electrodes 12 are formed to cover the second shielding films 11 and the common substrate 2.

An insulating film is omitted in a plan view of FIG. 5, while opposed electrodes are omitted in a plan view of FIG. 6. Alignment films to be formed on the opposed electrodes 12 and the pixel electrodes 8 are omitted in FIG. 6.

In the active matrix type liquid crystal display panel with the above configuration, since the first shielding films 10 made of black resin are formed between the pixel electrodes 8 on the TFT substrate 1, only the margin W (about 2 μm) required when the opening portions 10a are formed in the first shielding films 10 should be taken account to compensate for displacement of the first shielding films 10. Thus the aperture efficiency is increased.

Furthermore, since the second shielding films 11 which is formed in size to provide the alignment margins $W_1$ for lamination of the substrates are formed in areas of the common substrate 2 opposing to the TFTs 4, there is no possibility that the light is irradiated from the light source to the TFTs 4. In addition, because the alignment margins $W_1$ are provided for only the second shielding films 11, reduction in the aperture efficiency caused by the shielding film can be suppressed at a minimum.

Meanwhile, in the configuration shown in FIG. 4, the first shielding films 10 and the second shielding films 11 may be formed of black resin. In this event, since the shielding films are arranged twice over the TFTs 4, if respective light transmittances of the first shielding films 10 and the second shielding films 11 are assumed as 1%, resultant light transmittance can be reduced to 0.01% when overlapped together.

In this case, since there is no metal film on the first shielding films 10, parasitic capacitance becomes extremely small even if conductivity of black resin of 1 μm in thickness is taken account of.

In case shielding effect of the light incident into the TFTs 4 can be assured sufficiently by the second shielding films 11, the first shielding films 10 on the TFTs 4 may be removed upon patterning the opening portions 10a because there is no need to cover the TFTs 4 by the first shielding films 10.

(Second Embodiment)

Figure 8:
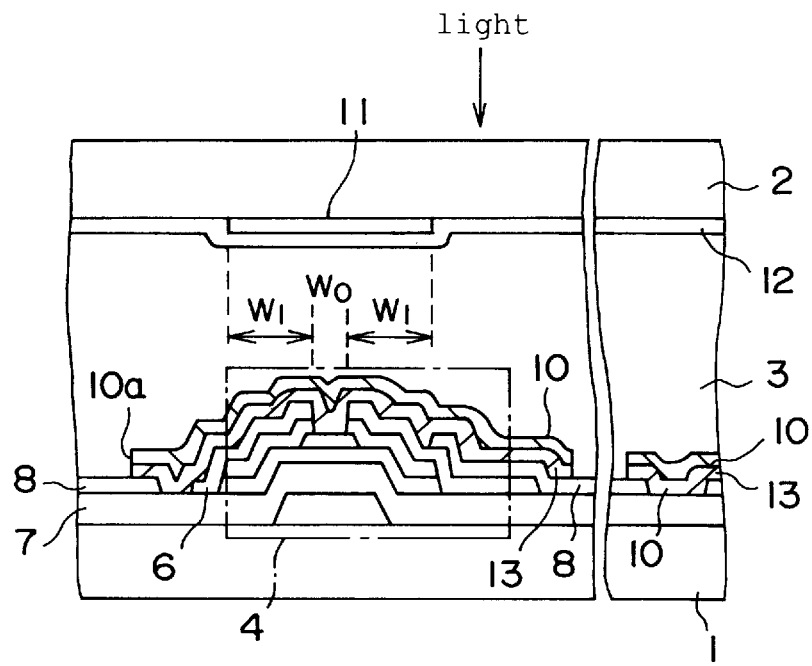
FIG. 8 is a sectional view showing an active matrix type liquid crystal display panel according to a second embodiment of the present invention.

Although the first shielding films 10 on the TFT substrate have been formed of black resin in the above liquid crystal display panel, a base insulating film 13 may be interposed beneath the first shielding film 10 and also the first shielding film 10 may be formed of metal film such as Cr or Al, as shown in FIG. 8.

However, if the base insulating film 13 is thick, parasitic capacitance is caused between the pixel electrodes 8 and the bus lines 5, 6 via the first shielding film 10 which is conductive. Therefore, the first shielding film 10 must be made thin less than 75 nm to increase resistance value. However, since light transmittance is increased in excess of 1% if the first shielding film 10 is made excessively thin, a thickness of the first shielding film 10 must be formed more than 38 nm. Accordingly, the appropriate range of the first shielding film 10 made of metal is 38 to 75 nm in thickness.

The base insulating film 13 interposed beneath the first shielding film 10 made of metal may be formed of material with low dielectric constant such as acrylic resin or photoresist of 1 to 2 mm in thickness to reduce parasitic capacitance. However, if the base insulating film 13 is formed of resin, though having low dielectric constant, the first shielding film 10 of metal formed on the resin cannot be formed uniformly and thus in some cases pin holes may be caused in the first shielding film 10. Therefore, it is not preferable to made the first shielding film 10 excessively thin. The above range of thickness can be concluded as suitable.

(Third Embodiment)

Since stress occurs in acrylic resin, resist, or black resin because of its thermosetting property, transistor characteristics are degraded if such resin is directly contacted to the operation semiconductor layers 4a of the TFTs 4.

Figure 9:
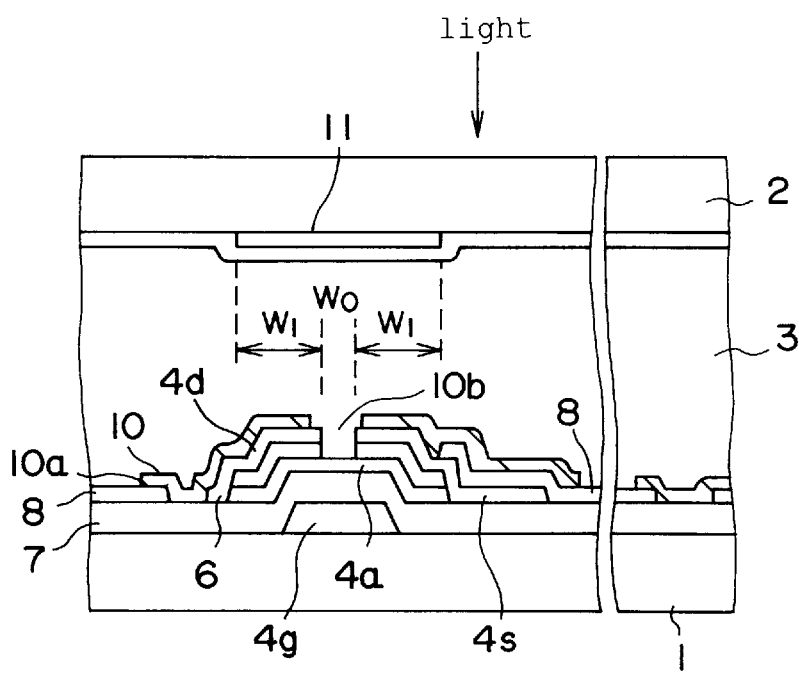
FIG. 9 is a sectional view showing an active matrix type liquid crystal display panel according to a third embodiment of the present invention.

Therefore, in the event that the TFTs 4 are used wherein the operation semiconductor layers 4a are not covered by the protection film, such resin has to be removed from the areas between the source electrodes 4s and the drain electrodes 4d, as shown in FIG. 9.

FIG. 9 shows the situation wherein, in the TFTs 4 without the protection film, second opening portions 10b are formed by removing the first shielding films 10 made of black resin from the areas between the source electrodes 4s and the drain electrodes 4d. The first shielding films 10 are removed simultaneously when the second opening portions 10b are formed.

(Fourth Embodiment)

Figure 10A:
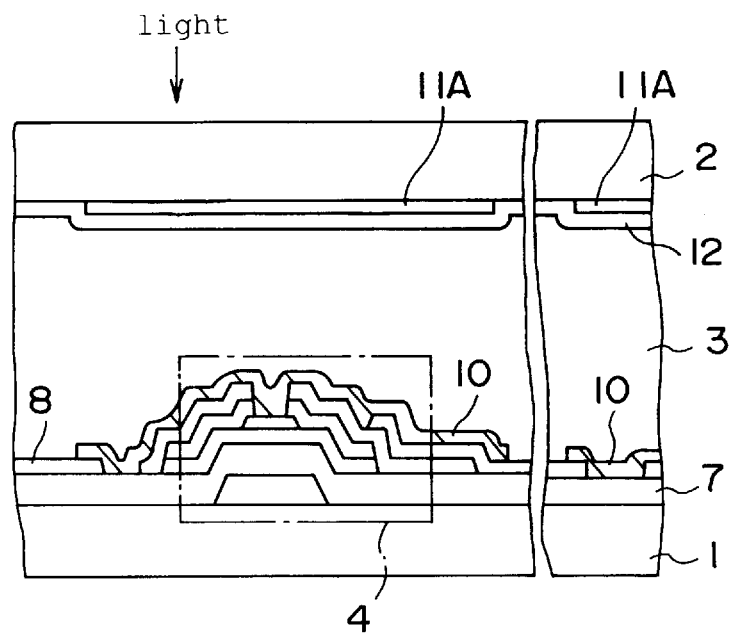
FIG. 10A is a sectional view showing a thin film transistor and its neighboring region in an active matrix type liquid crystal display panel according to a fourth embodiment of the present invention.
Figure 10B:
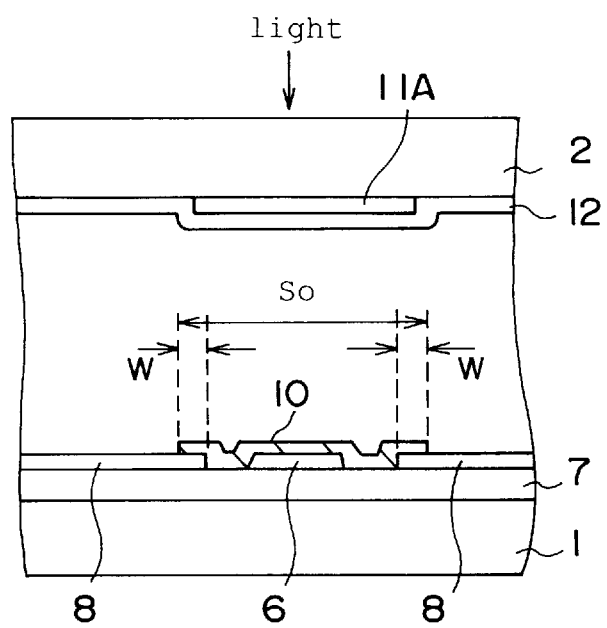
FIG. 10B is a sectional view showing a data bus line and its neighboring region in the active matrix type liquid crystal display panel in FIG. 10A.

In the next, although the second shielding films 11 of metal have been arranged only over the TFTs in the example shown in FIG. 7A, second shielding films 11A may be expanded up to the areas opposing to the first shielding films 10, as shown in FIGS.10A and 10B.

However, in the areas of the second shielding films 11A excepting opposing portion thereof to the TFTs 4, it is necessary not to overlap the second shielding films 11A with the opening portions in the first shielding film when the TFT substrate 1 and the common substrate 2 are sticked with each other. This is because reduction in aperture efficiency must be prevented.

Hence, in the areas wherein the TFTs 4 are not formed, the second shielding films 11A must be formed in size equal to or smaller than the first shielding films 10 not to protrude the second shielding films 11A into the pixel electrodes 8 rather than the first shielding films 10.

With the above configuration, since the second shielding films 11A of metal intercepts such strong incident light as one million lux from the light source, heating of the first shielding films 10 of black resin can be prevented completely so that deterioration in display owing to increase in the temperature of the liquid crystal display panel can be prevented.

(Fifth Embodiment)

Although the shielding film to be formed on the TFT substrate 1 has been formed of black resin in the first embodiment, such shielding film may be formed of white resin.

Figure 11A:
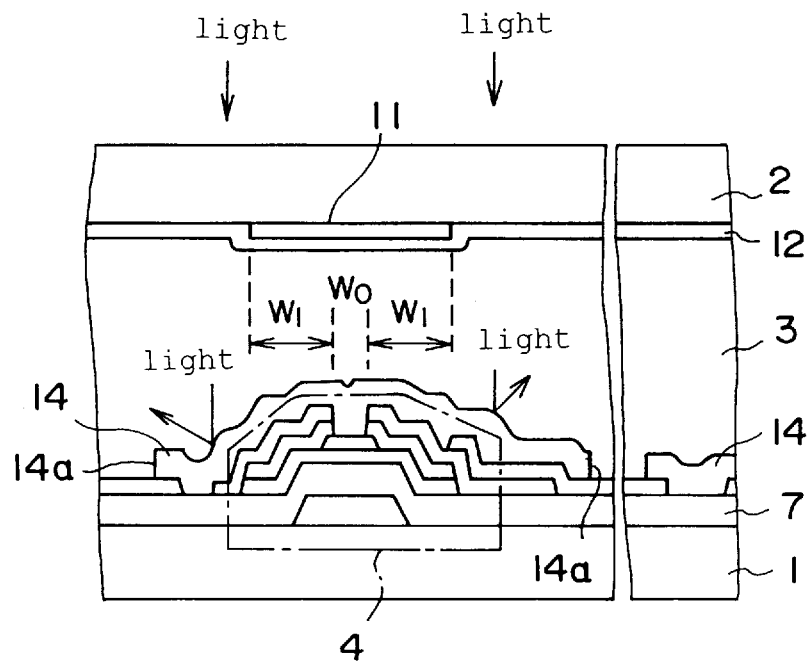
FIG. 11A is a sectional view showing a thin film transistor and its neighboring region in an active matrix type liquid crystal display panel according to a fifth embodiment of the present invention.
Figure 11B:
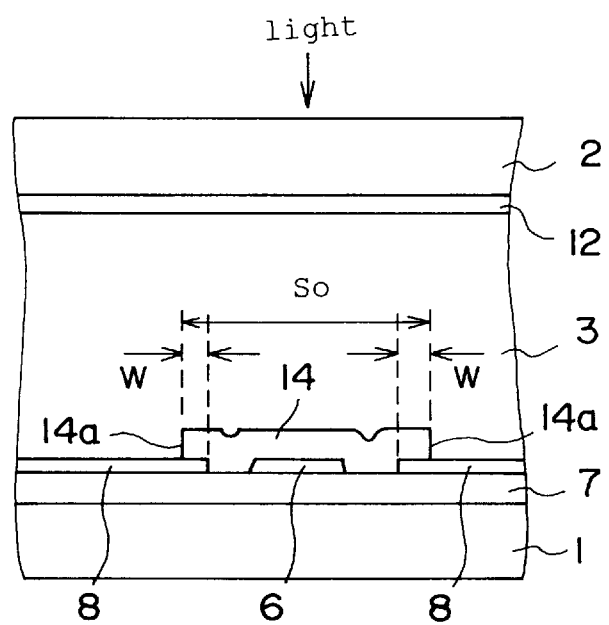
FIG. 11B is a sectional view showing a data bus line and its neighboring region in the active matrix type liquid crystal display panel in FIG. 11A.

For purposes of example, as shown in FIGS.11A and 11B, in areas on the pixel electrodes 8 protruding inwardly from edges of the pixel electrodes 8 by almost 2 $\mu$m and areas between the pixel electrodes 8 on the TFT substrate 1, first shielding films 14 made of white resin having a thickness of about 1 $\mu$m are formed to cover the TFTs 4, the gate bus lines 5 and the data bus lines 6.

In other words, opening portions 10a are formed in the first shielding film 14 to expose the pixel electrodes 8, and the opening portions 10a provide respectively patterning margin W of about 2 $\mu$m to prevent protrusion from the pixel electrodes 8.

Such white resin can be obtained as a thin film by scattering white pigment into organic resin such as acrylic system having photosensitive property, for example. If pigment such as titanium oxide, silica gel, barium sulfate, or calcium carbonate, which has refractive index higher significantly than that of organic resin, is scattered as the white pigment, such thin film can be obtained that has stronger shielding force than photoresist and exhibits white color.

Consequently, as shown in FIG. 11A, since optical energy irradiated from the light source to the liquid crystal display panel is not absorbed by the first white shielding film 14 but reflected, increase in the temperature of the liquid crystal display panel can be suppressed. For this reason, variation in the transistor characteristics of the TFTs 4 and the characteristics of the liquid crystal can be suppressed.

In addition, since the opening portions 14a to be formed in the liquid crystal display panel can be specified by the first white shielding film 14 on the TFT substrate 1, aperture efficiency can be improved by about 13% in 3.2 inch VGA mode, about 27% in 2 inch VGA mode, and about 35% in 3.2 inch XGA mode in comparison with the conventional liquid crystal display panel including lamination margin therein, and also luminance of projection screen can be improved.

Moreover, photo-excited current of the TFTs 4 can be suppressed since the TFTs 4 are covered by the first shielding (reflection) film 14 and the second shielding (reflection) film 11.

According to the above improvement of the liquid crystal display panel, images of high luminance and high quality ca be achieved.

Figure 12:
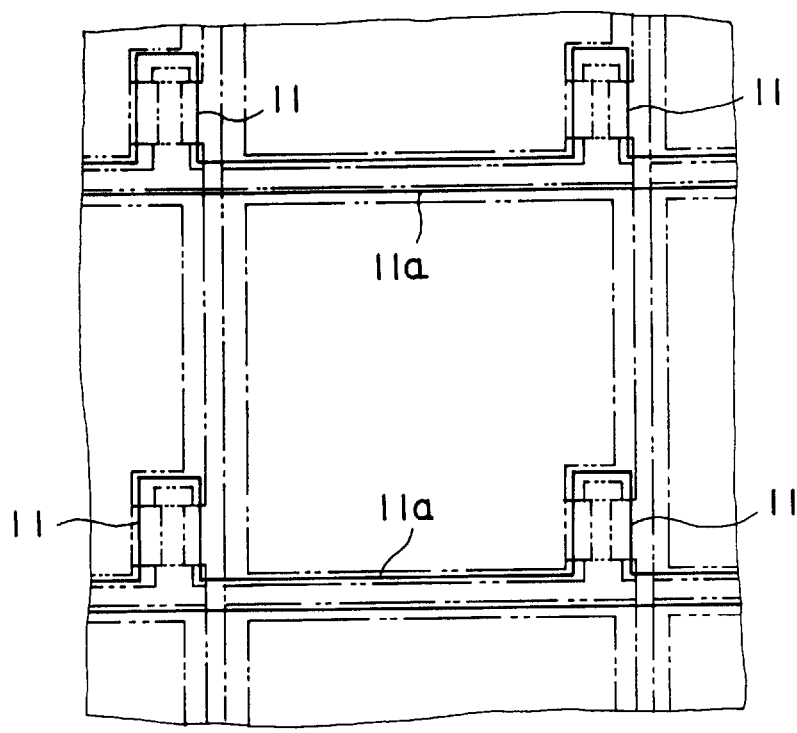
FIG. 12 is a plan view showing a common substrate in the active matrix type liquid crystal display panel according to the fifth embodiment of the present invention.

In the fifth embodiment, like the first embodiment, the second shielding films 11 may be formed on the common substrate 2 and/or the second shielding films 11 may be connected to each other, as shown in FIG. 12. If the second shielding films 11 are connected mutually, the opposed electrodes 12 may be formed to have low resistance by connecting the second shielding films 11 by metal patterns 11a, which is made of metal film (e.g., Cr film) constituting the second shielding films 11, along the gate bus lines 5. As a result, voltage distribution is rendered uniform.

(Sixth Embodiment)

There is a possibility that some of the light pass through the shielding films made of white resin explained in the fifth embodiment.

Figure 13A:
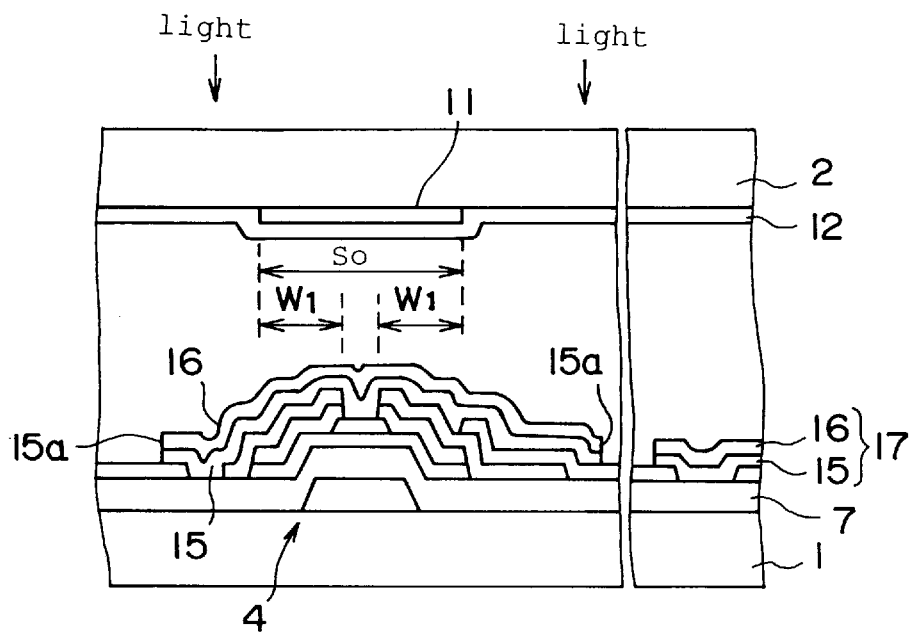
FIG. 13A is a sectional view showing a thin film transistor and its neighboring region in an active matrix type liquid crystal display panel according to a sixth embodiment of the present invention.
Figure 13B:
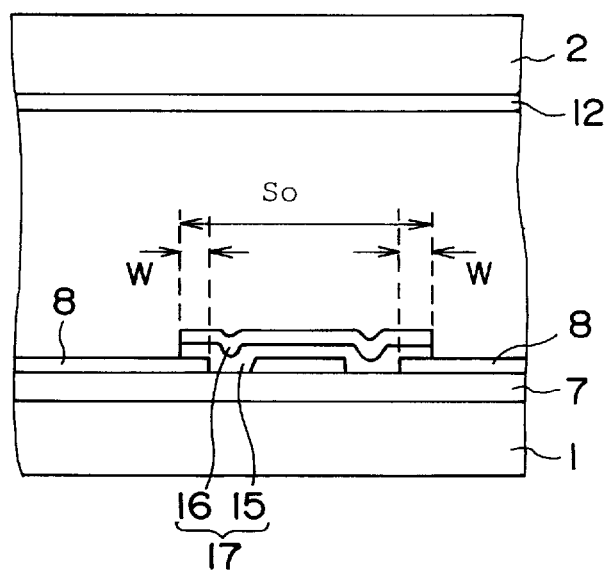
FIG. 13B is a sectional view showing a data bus line and its neighboring region in the active matrix type liquid crystal display panel in FIG. 13A.

In this case, as shown in FIGS. 13A and 13B, the first shielding film 17 may be formed as a multi-layered structure wherein a black resin layer 15 of 1 $\mu$m in thickness and a white resin layer 16 of 1 $\mu$m in thickness are formed in sequence on the TFT substrate 1.

With this structure, the white resin layer 16 can reflect the light while the black resin layer 15 can absorb some of the light passed through the white resin layer 16, and as a result light leakage can be prevented firmly. In contrast to the case where the shielding film is formed of only black resin, increase in the temperature of the liquid crystal display panel can be suppressed based on fewer thermal absorption.

In the case where the black resin layer 15 is made of carbon containing resin, it is desired that carbon is contained in the layer 15 as small as possible since the layer 15 is rendered conductive by too much contained carbon.

(Seventh Embodiment)

The configurations described in the above first to sixth embodiments can be applied not only to the liquid crystal projector but also the direct-view type liquid crystal display. For the shielding film of the liquid crystal display panel for use in the color liquid crystal projector, the following configuration can be used in addition to the above configurations.

Figure 14:
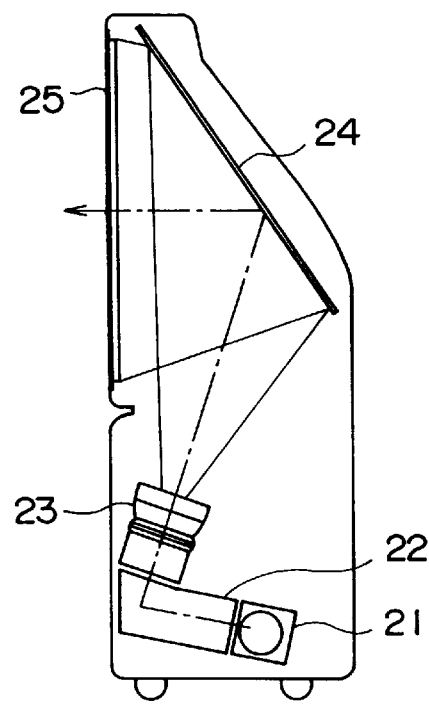
FIG. 14 is a schematic view showing a configuration of a color liquid crystal projector of the present invention.

For example, as shown in FIG. 14, the color liquid crystal projector is so constructed that the light emitted from the light source 21 such as metal halide lamp is irradiated to the liquid crystal display portion 22, then images formed by the liquid crystal display portion 22 are irradiated into the screen 25 via the projection lens 23 and the mirror 24.

Figure 15:
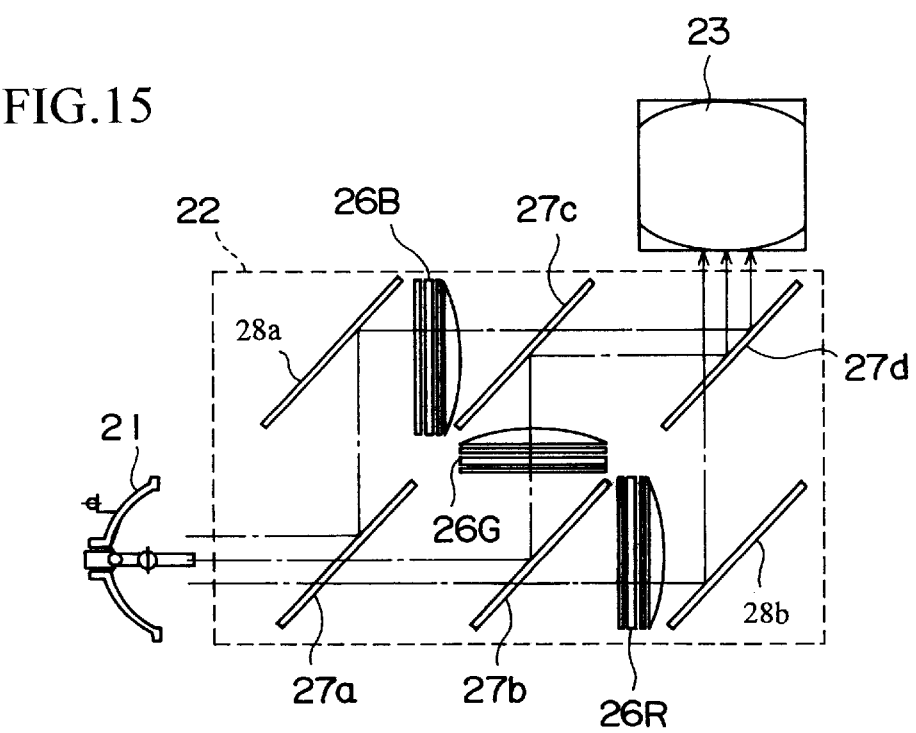
FIG. 15 is a schematic view showing a configuration of a liquid crystal display section in the color liquid crystal projector.

As shown in FIG. 15, the liquid crystal display portion 22 may adopt triple element control using blue liquid crystal display panel 26B, green liquid crystal display panel 26G, and red liquid crystal display panel 26R.

Referring to FIG. 15, white light emitted from the light source 21 are separated into three colors, i.e., blue, green, and red, by two dichromatic mirrors 27a, 27b. Blue light is irradiated into the blue liquid crystal display panel 26B, green light is irradiated into the green liquid crystal display panel 26G, and red light is irradiated into the red liquid crystal display panel 26R. After passing through the liquid crystal display panels 26B, 26G, and 26R respectively, blue, green, and red lights are synthesized by two reflection mirrors 28b and two dichromatic mirrors 27c, 27d to irradiate into the projection lens 23.

In areas between the pixel electrodes and around peripheries of the pixel electrodes in respective liquid crystal display panels 26B, 26G, 26R, the shielding films made of white resin, black resin, or metal, as described above, may be provided. Otherwise, colored resin except for white and black resins may be used as explained in the following.

Figure 16:
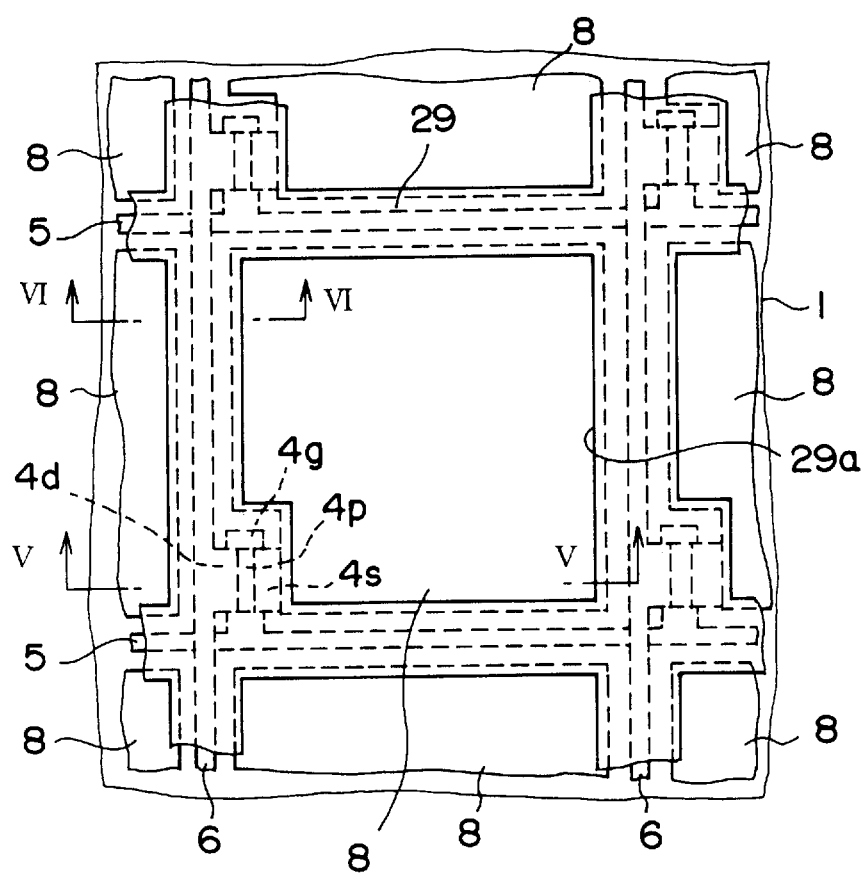
FIG. 16 is a plan view showing one pixel region of a TFT substrate in an active matrix type liquid crystal display panel according to a seventh embodiment of the present invention.
Figure 17A:
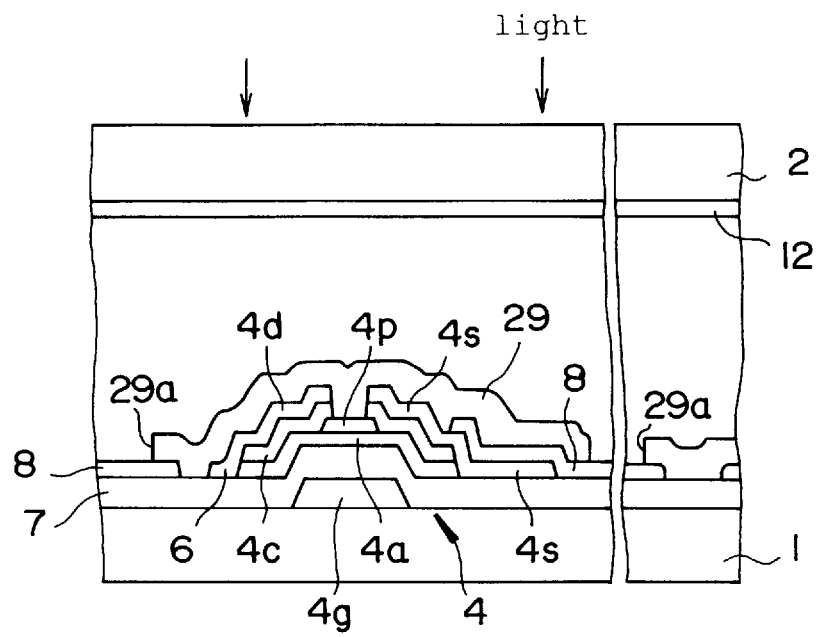
FIG. 17A is a sectional view showing the liquid crystal display panel in FIG. 16 taken along line V—V.
Figure 17B:
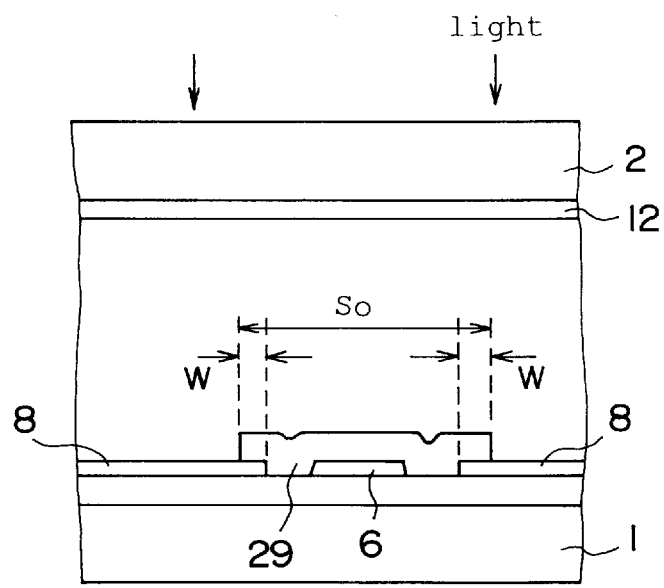
FIG. 17B is a sectional view showing the liquid crystal display panel in FIG. 16 taken along line VI—VI.

In turn, a configuration of the red liquid crystal display panel 26R will be explained for purposes of illustration. FIG. 16 is a plan view showing a TFT substrate in the red liquid crystal display panel. FIGS.17A and 17B are sectional views showing the red liquid crystal display panel in FIG. 16. In FIGS.17A and 17B, like references in FIGS.7A and 7B identify like parts.

In FIGS.16, 17A and 17B, in areas on the pixel electrodes 8 protruding inwardly from edges of the pixel electrodes 8 by almost 2 μm and areas between the pixel electrodes 8 on the TFT substrate 1, first shielding films 29 made of red resin having a thickness of about 2 μm are formed to cover the TFTs 4, the gate bus lines 5 and the data bus lines 6.

In other words, opening portions 29a are formed in the first shielding film 29 to expose the pixel electrodes 8, and the opening portions 29a provide respectively patterning margin W of about 2 μm to prevent protrusion from the pixel electrodes 8.

Such red resin can be obtained by scattering red pigment into organic resin such as acrylic system having photosensitive property, for example. Lakered, etc. may be used as such red pigment, and the red pigment with a large particle diameter of about 0.5 μm is used. The first shielding film 29 including red pigment having such particle diameter tends to reflect red color rather than absorb it.

Accordingly, as shown in FIG. 17A, since red optical energy irradiated from the light source 21 into the red liquid crystal display panel 26R is reflected by the first shielding film 29, increase in the temperature of the liquid crystal display panel 26R can be suppressed. For this reason, variation in the transistor characteristics of the TFTs 4 and the characteristics of the liquid crystal can be suppressed.

In similar fashion, such configuration can also be applied to the blue liquid crystal display panel 26B and the green liquid crystal display panel 26G. More particularly, the shielding film on the TFT substrate of the blue liquid crystal display panel 26B is formed of resin in which blue pigment with a particle diameter of about 0.5 μm is mixed, and the shielding film on the TFT substrate of the green liquid crystal display panel 26G is formed of resin in which green pigment with a particle diameter of about 0.1 to 0.5 μm is mixed. Phthalocyanine blue and the like may be listed as blue pigment and phthalocyanine green and the like may be listed as green pigment.

Thus images with high luminance and high quality can be implemented.

In FIG. 17A and 17B, though no shielding film is provided on the common substrate 2, photo-excited current of the TFTs 4 may be prevented firmly by providing the second shielding film shown in the first embodiment.

(Eighth Embodiment)

There is a possibility that part of the light pass through the shielding films made of color resin described in the seventh embodiment.

Figure 18A:
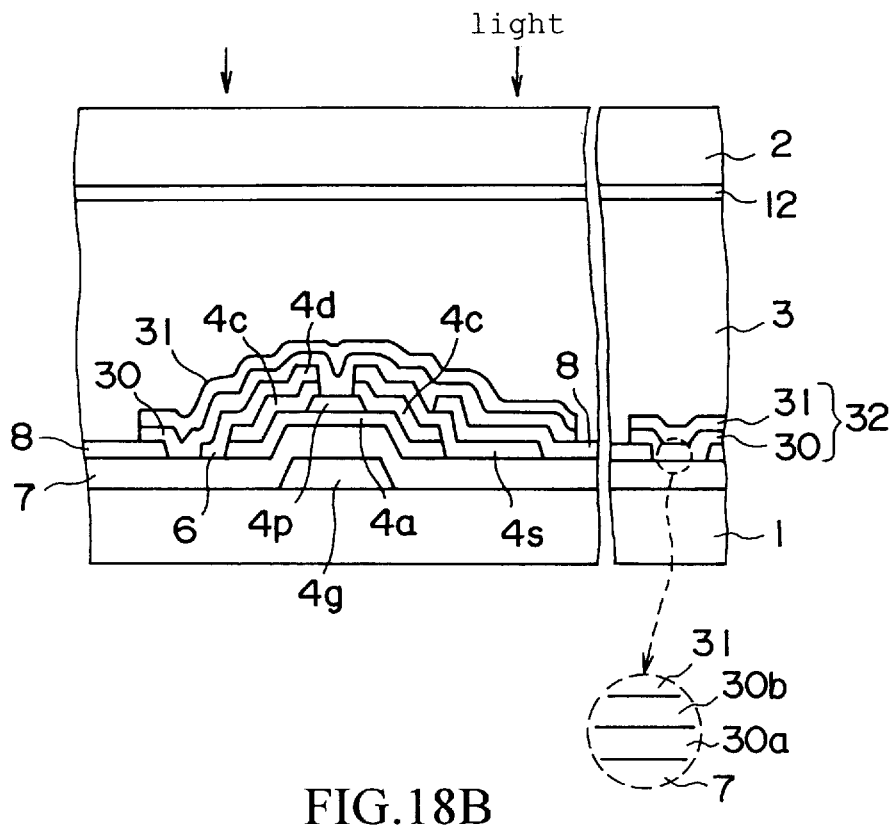
FIG. 18A is a sectional view showing a thin film transistor and its neighboring region in an active matrix type liquid crystal display panel according to an eighth embodiment of the present invention.
Figure 18B:
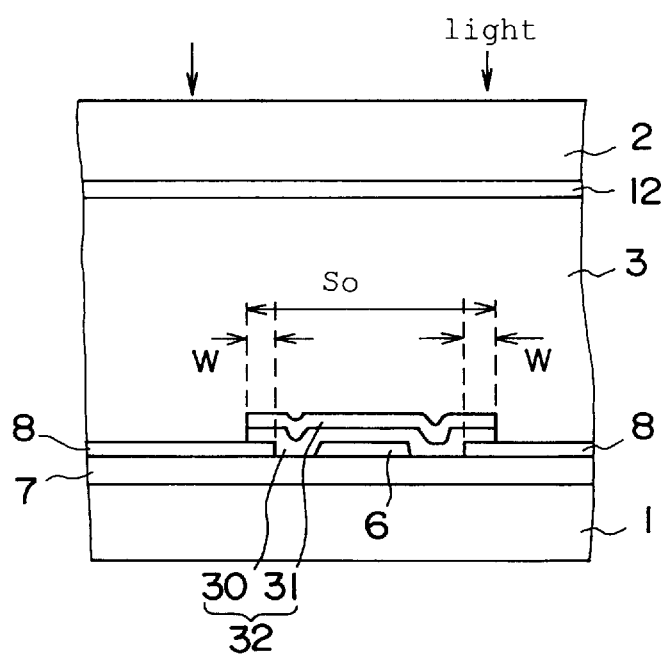
FIG. 18B is a sectional view showing a data bus line and its neighboring region in the active matrix type liquid crystal display panel in FIG. 18A.

In this case, as shown in FIGS. 18A and 18B, the first shielding film 32 may be formed as a multi-layered structure wherein a lower resin layer 30 of 1 μm in thickness and a red, blue or green resin layer 31 of 1 μm in thickness are formed in order on the TFT substrate 1.

If the lower resin layer 30 is formed of a black resin layer, the color resin layer 31 can reflect the light while the black resin layer 30 can absorb some of the light passed through the color resin layer 31, and as a result light leakage can be prevented firmly. In comparison with the case where the shielding film is formed of only black resin, increase in the temperature of the liquid crystal display panel can be suppressed because of fewer thermal absorption.

If the lower resin layer 30 is formed of a white resin layer, the color resin layer 31 can reflect the light passed through the color resin layer 31 to thereby enhance reflection efficiency.

If the color resin layer 31 is formed of a red resin layer and the lower resin layer 30 is formed as a double-layered structure consisting of a blue resin layer 30a and a green resin layer 30b, as shown by a broken line in FIG. 18A, lights having colors except for red are reflected or absorbed by the blue resin layer 30a and the green resin layer 30b when the liquid crystal panel includes colors other than red, so that transmission of the light can be prevented.

Similarly, if the color resin layer 31 is formed of a blue resin layer, a red resin layer and a green resin layer may be formed as the lower resin layer. Otherwise, if the color resin layer 31 is formed of a green resin layer, a red resin layer and a blue resin layer may be formed as the lower resin layer. In these cases, transmission of the light having color slightly included can also be prevented.

If negative type photosensitive resin is used as the color resin layer 31 and also positive type photosensitive resin is used as the lower resin layer 30, upon exposing and developing the color resin layer 31, the lower resin layer 30 in the to-be-left regions are covered by the color resin layer 31 and thus in no ways removed, while the light is not irradiated into the to-be-removed regions, which results in insoluble state against liquid developer. Thereafter, the lower resin layer 30 is exposed using patterns of the color resin layer 31 as a mask and then developed. However, these technics can be applied in the situation where the color resin layer 31 and the lower resin layer 30 are formed to have substantially similar planar shape.

(Ninth Embodiment)

In the above embodiments, in case the shielding film on the TFT substrate 1 is formed to have a thickness more than 1 μm, inversely tilted domains, i.e., in which rising orientation of liquid crystals are directed inversely to that in a normal state, reside in part of boundaries between the pixel electrodes 8 and the shielding films under the condition where high voltage is being applied between the pixel electrodes 8 and the opposed electrodes 12.

Such inversely tilted domains are generated due to lateral electric field generated from the gate bus lines 5 and the data bus lines 6, step formed around the shielding films, rubbing direction of the alignment film, and the like.

Figure 1:
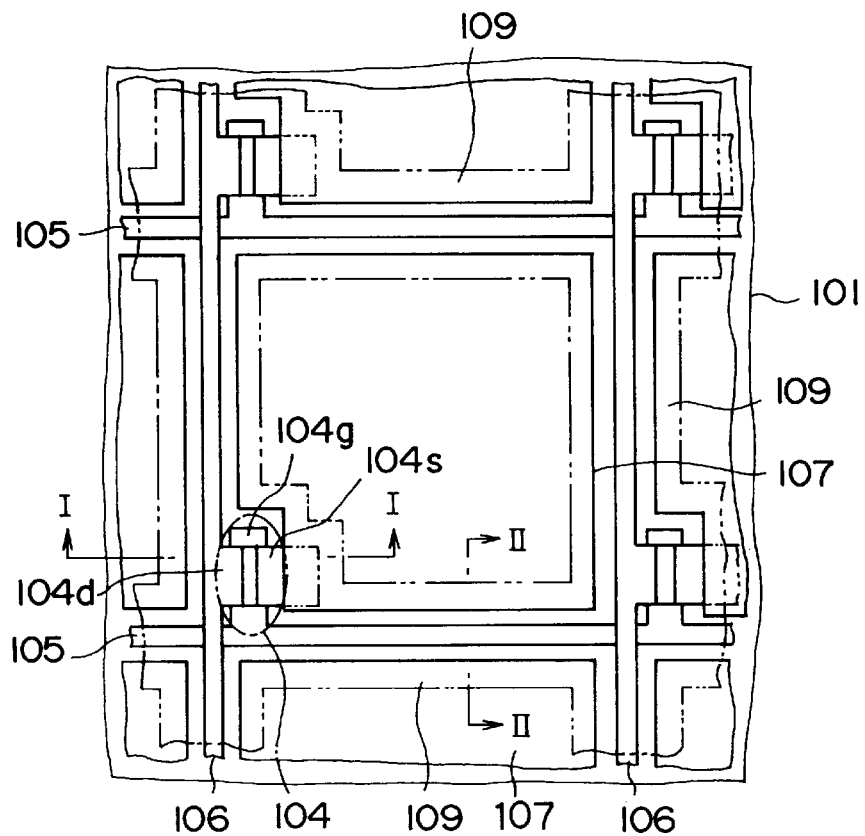
FIG. 1 is a plan view showing one pixel region of a TFT substrate of an active matrix type liquid crystal display panel according to a first conventional example.
Figure 3:
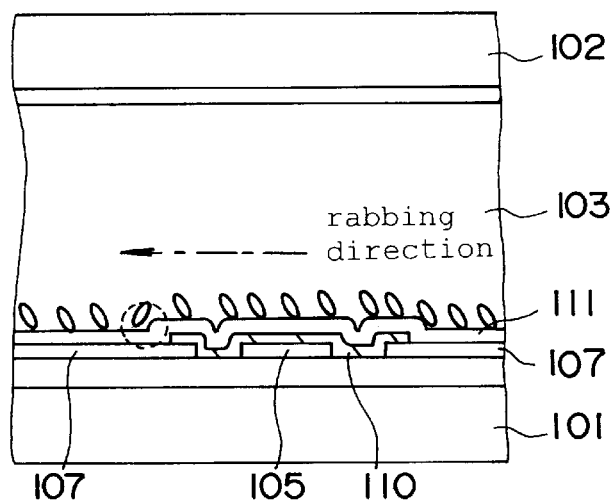
FIG. 3 is a sectional view showing a gate bus line and its neighboring region of the active matrix type liquid crystal display panel according to a second conventional example.
Figure 2A:
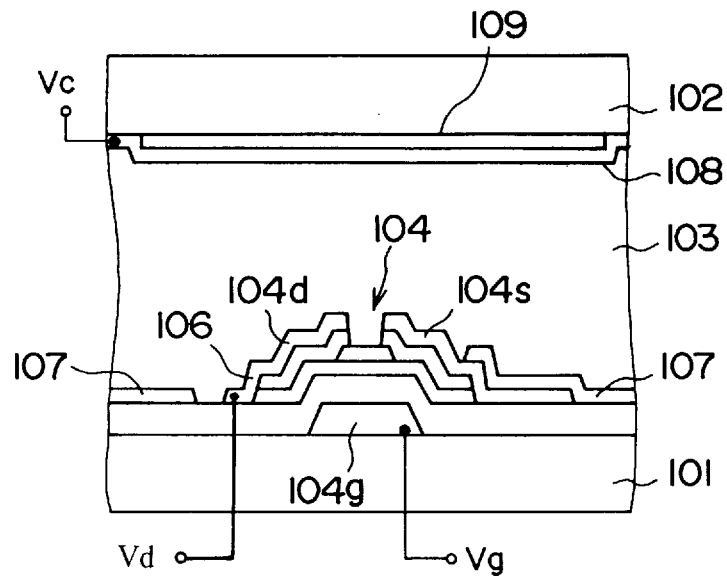
FIG. 2A is a sectional view showing the liquid crystal display panel in FIG. 1 taken along line I—I.
Figure 2B:
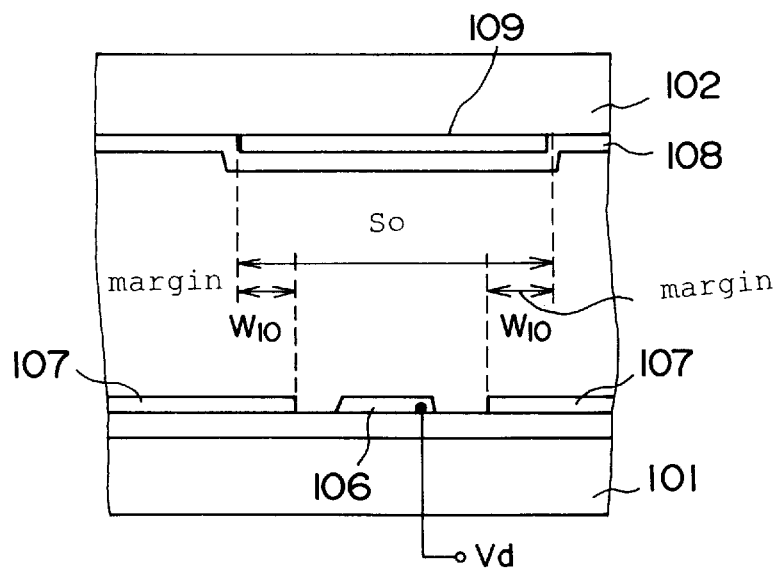
FIG. 2B is a sectional view showing the liquid crystal display panel in FIG. 1 taken along line II—II.

For instance, as shown in FIGS.1 and 3, if a surface of the alignment film 111 for covering the pixel electrodes 8, the gate bus lines 5, the data bus lines 106, the shielding electrode patterns 109 is rubbed in one pixel region, molecules of the liquid crystals are risen on the pixel electrodes 8 in the opposite direction to those in the other regions by electric field generated from the gate bus lines 105 and the data bus lines 106 which are located backwardly relative to the rubbing direction. Normal molecules of the liquid crystals are risen forwardly relative to the rubbing direction.

Figure 19A:
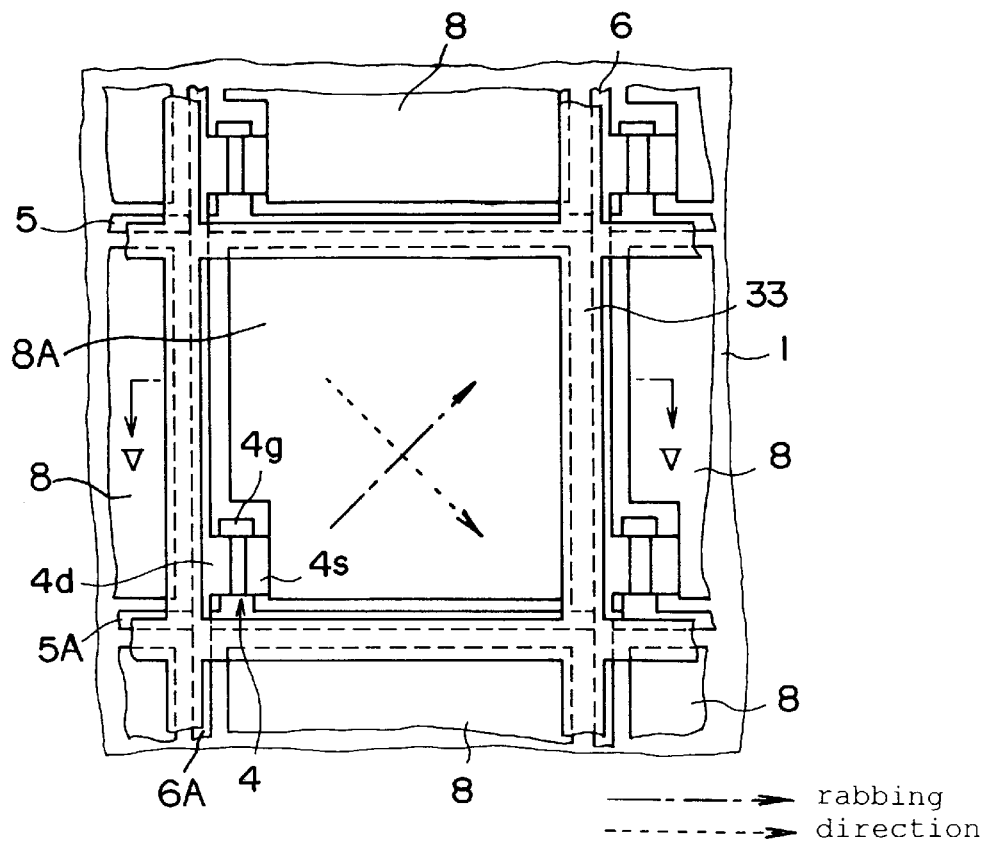
FIG. 19A is a plan view showing one pixel region of a TFT substrate in an active matrix type liquid crystal display panel according to a ninth embodiment of the present invention.
Figure 19B:
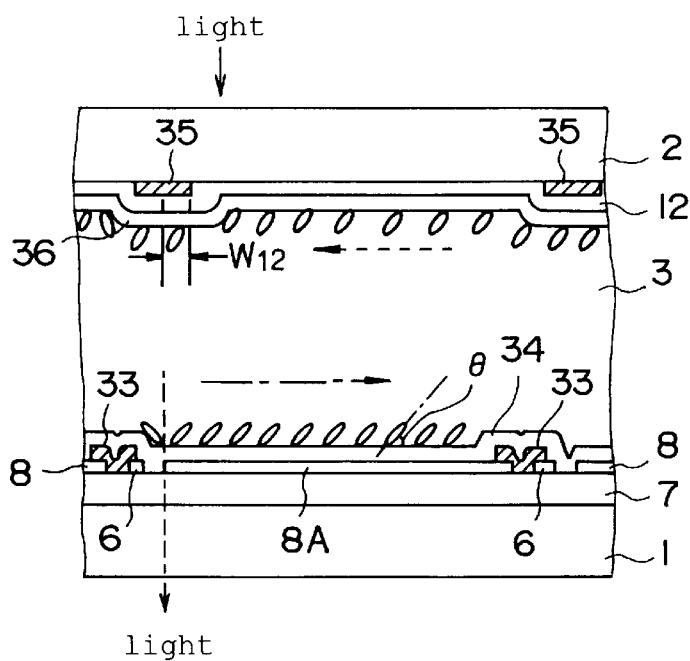
FIG. 19B is a sectional view showing the one pixel region in the active matrix type liquid crystal display panel in FIG. 19A.

Once such inversely tilted domains occur, the light is ready to leak out from boundaries between normally tilted domains and the inversely tilted domains to lower display contrast. In order to prevent this phenomenon, it would be preferable that the first shielding films on the TFT substrate are formed to have patterns, as shown in FIGS.19A and 19B.

The first shielding films 33 are similar to those in the above embodiments in that it is composed of black resin, white resin, color resin, or thin metal with low resistance, but the regions covering the pixel electrodes 8 will be formed as follows.

Since alignment films 34 formed on the rectangular pixel electrodes 8 are rubbed on the diagonal from one corners, to which the TFTs 4 are connected, to other corners, it is in regions near the gate bus lines 5A and the data bus lines 6A that such inversely tilted domains are easily caused by lateral electric field generated by the gate bus lines 5A and the data bus lines 6A, both being connected to the TFTs 4.

Accordingly, if the pixel electrodes 8A positioned in regions near the gate bus lines 5A and the data bus lines 6A are covered by the first shielding film 33, domains of the liquid crystals located on the steps between the pixel electrodes 8A and the first shielding film 33 are oriented inversely to those in other regions.

Therefore, in case, in the rectangular pixel electrodes 8A, two sides which are prone to be easily subjected to the electric field of the gate bus lines 5A and the data bus lines 6A are not covered by the first shielding film 33 and alternatively regions being protruded inwardly from edges of remaining two sides by 2 μm are covered by the first shielding film 33, it is hard for the inversely tilted domains to occur on the pixel electrodes 8A.

In this event, regions formed between two sides of the rectangular pixel electrodes 8A not covered by the first shielding film 33 and the gate bus lines 5A, the data bus lines 6A and regions on the TFTs 4 are not covered by the first shielding film 33. However, in one pixel region, regions located between the gate bus lines 5A and the data bus lines 6A which are located far from the pixel electrodes 8A would be covered by the first shielding film 33.

Figure 20:
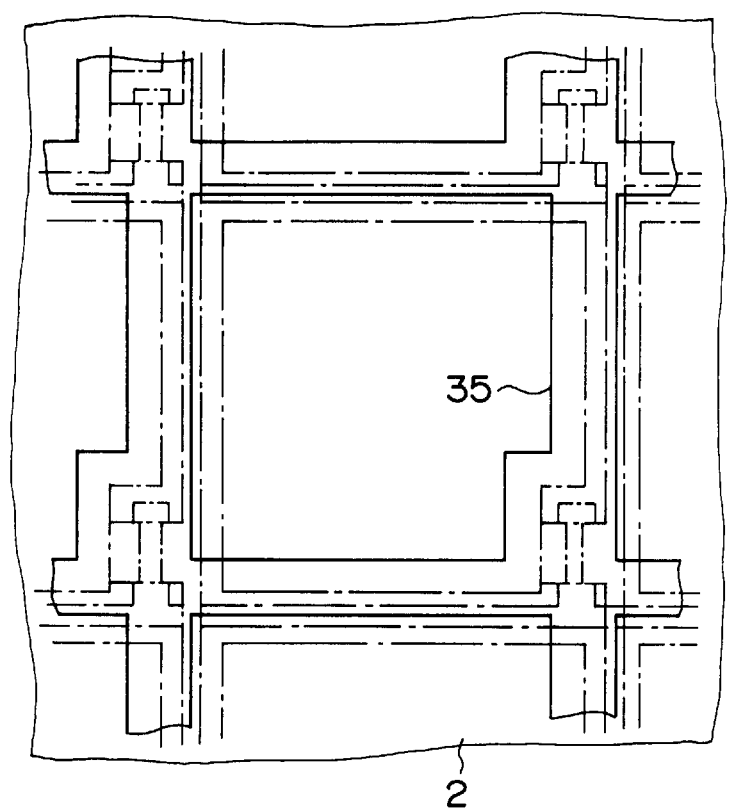
FIG. 20 is a plan view showing the one pixel region of a common substrate in an active matrix type liquid crystal display panel according to the ninth embodiment of the present invention.

As shown in FIG. 20, the second shielding films 35 are formed on a surface of the common substrate 2 opposing to the TFT substrate 1 so as to face to both regions between two sides of the pixel electrodes 8A not covered by the first shielding film 33 and the gate bus lines 5A, the data bus lines 6A and regions on the TFTs 4. The second shielding films 35 is formed of chromium, chromium oxide, or the like.

The second shielding films 35 must be formed to assure the alignment margin $W_{12}$ of about 5 μm between the substrates.

The above structure may be utilized in other pixel regions.

Since only regions on the TFT substrate other than the regions in which inversely tilted domains are apt to be caused are covered by the first shielding film 33 while the second metal shielding films 35 are formed in regions on the common substrate 2 opposing to the regions in which inversely tilted domains are apt to be caused, the liquid crystal display panel without light leakage can be achieved. Further, since the TFTs 4 are covered by the second shielding film 35, generation of leakage current due to photoelectromotive force can be prevented in the TFTs 4.

Though, to ensure the alignment margin between the substrate, aperture efficiency is made small in the pattern of the second shielding film 35 in comparison with those of the above embodiments, aperture efficiency can be enlarged by the amount that part of the pixel electrodes 8 is covered by the first shielding film 33 on the TFT substrate 1 rather than the conventional liquid crystal display panel which has the shielding film only on the common substrate 2.

Since the inversely tilted domains generated around the second shielding film 35 on the common substrate 2 are covered by the first shielding film 37, light leakage does not occur.

In turn, when aperture efficiency and alignment of the liquid crystals has been examined while comparing with the conventional device, the result could be obtained as shown in Table I.

TABLE I

|  | Present Embodiment | Comparative Example (1) | Comparative Example (2) |
| --- | --- | --- | --- |
| Aperture Rate | 54.8% | 58.0% | 51.1% |
| Orientation | good | Inversely tilted domains occur in whole area | good |

A comparative example 1 is the liquid crystal display panel in which the shielding film made of black resin is formed around the pixel electrodes only on the TFT substrate side. A comparative example 2 is the liquid crystal display panel in which the shielding film is formed only on the common substrate side.

In the liquid crystal display panel in TABLE I, the number of pixel is 640×480, a distance between the pixel electrode and the gate bus line is 3 μm, a distance between the pixel electrode and the data bus line is 3 μm, and a pitch of the pixel electrode is 100 μm in both x, y directions. The shielding film on the TFT substrate is formed of acrylic system black resin, and the shielding film on the TFT substrate is formed of chromium oxide. The shielding film of black resin is formed to cover the periphery of the pixel electrode by a width of 2 μm. A thickness is set to 1 μm.

The alignment film covering the pixel electrodes, the bus lines, the shielding films, etc. are formed of polyimide of 1000 A in thickness. A pretilt angle is about 5 degree. Rubbing of the alignment film is selected in the direction in which the inversely tilted domains are easily generated around the TFT.

It is appreciated from TABLE I that the aperture efficiency can be increased and good alignment can be obtained rather than the conventional one.

In the liquid crystal display panel in the ninth embodiment, when the first shielding film is formed of white resin to have about 1.5 μm, the aperture efficiency and the alignment analogous to those in TABLE I can be attained. The white resin is the same as used in the fifth embodiment. In FIG. 19, a reference 36 denotes the second alignment film formed on the common substrate 2.

(Tenth Embodiment)

In the ninth embodiment, only such regions in which the inversely tilted domains are hard to be generated are covered by the first shielding film in the pixel electrodes 8A near the gate bus lines 5A and the data bus lines 6A. In this case, if neighboring areas of the gate bus lines 5A and neighboring areas of the data bus lines 6A are compared with each other, the inversely tilted domains are hard to be generated in the neighboring areas of the gate bus lines 5A.

Figure 21A:
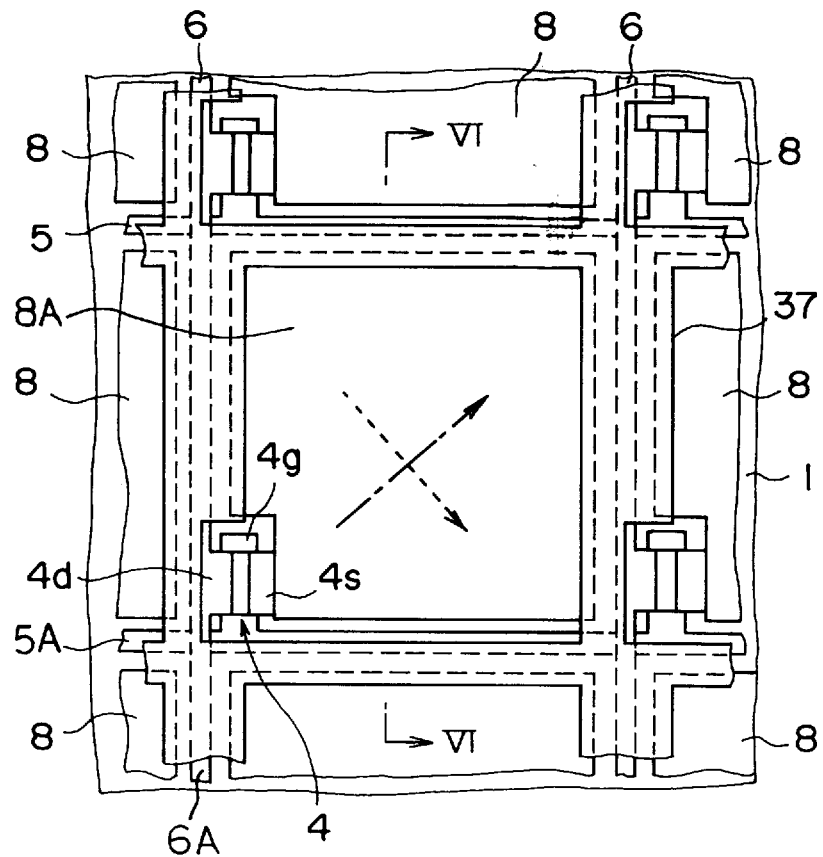
FIG. 21A is a plan view showing one pixel region of a TFT substrate in an active matrix type liquid crystal display panel according to a tenth embodiment of the present invention.
Figure 21B:
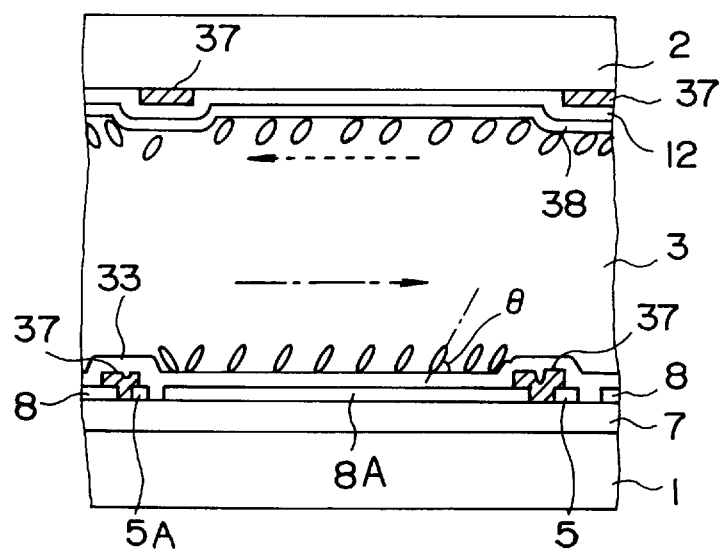
FIG. 21B is a sectional view showing the one pixel region in the active matrix type liquid crystal display panel in FIG. 21A.

Accordingly, as shown in FIGS.21A and 21B, like the first embodiment, the first shielding films 37 formed on the TFT substrate may be formed to cover edges of the pixel electrodes 8 located near the data bus line 6A and not to cover edges of the pixel electrodes 8 located near the gate bus line 5A, in the neighboring areas of which the inversely tilted domains are readily to be generated.

Figure 22:
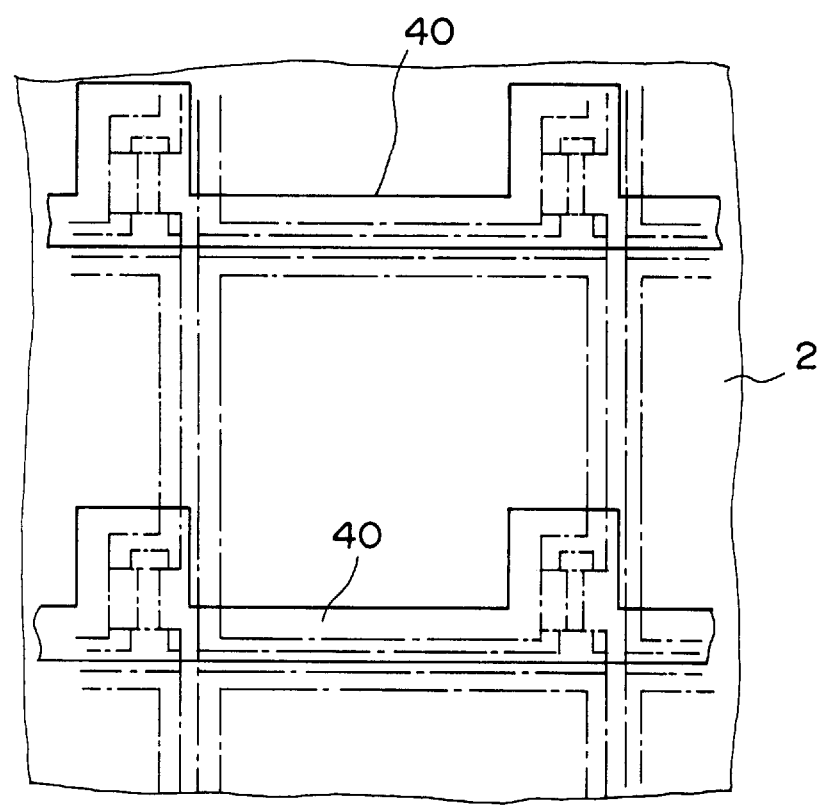
FIG. 22 is a plan view showing the one pixel region of a common substrate in the active matrix type liquid crystal display panel according to the tenth embodiment of the present invention.

In this case, as shown in FIG. 22, the second shielding film 40 is formed on the common substrate with such a pattern that covers areas being not covered by the first shielding film 37 between the pixel electrodes 8A and the gate bus lines 5A and also covers the TFTs 4.

According to the liquid crystal display panel having such first and second shielding films 37 and 40, the aperture efficiency has been able to be increased rather than the ninth embodiment.

For example, if a distance between the bus line and the pixel electrode is set to 4 μm, the first and second shielding films 37 and 40 in the tenth embodiment are used, and remaining structure is formed similarly to the structure of the liquid crystal display panel in the ninth embodiment, the aperture efficiency has become 54.3%. The inversely tilted domains have not been generated.

What is claimed is:

1. An active matrix type liquid crystal display panel comprising:
    a first substrate having a plurality of active devices, a plurality of scanning bus lines, a plurality of data bus lines, and a plurality of pixel electrodes;
    a second substrate having opposed electrodes on its surface opposing to said first substrate;
    a first shielding film formed on top of said active devices and in areas located between said pixel electrodes on said first substrate and positioned to cover at least said active devices from light coming in through said second substrate;
    a second shielding film formed on said second substrate in at least areas opposing to semiconductor regions of said active devices; and
    liquid crystals sealed between said first substrate and said second substrate.

2. An active matrix type liquid crystal display panel as claimed in claim 1, wherein said first shielding film is formed of black resin, white resin, or color resin.

3. An active matrix type liquid crystal display panel as claimed in claim 2, wherein microparticles of pigment, each having a particle diameter to reflect a particular color light, are scattered in said color resin.

4. An active matrix type liquid crystal display panel as claimed in claim 1, wherein said first shielding film is formed as a laminated structure consisting of a lower resin layer colored with a first color and an upper resin layer colored with a second color different form said first color.

5. An active matrix type liquid crystal display panel as claimed in claim 4, wherein said lower resin layer is a white resin layer or black resin layer, and said upper resin layer is a color resin layer.

6. An active matrix type liquid crystal display panel as claimed in claim 4, wherein said upper resin layer is a red resin layer, blue resin layer or green resin layer, and said lower resin layer is formed as a double-layered structure consisting of two-color resin layers including two colors of red, blue, and green which are not included in said upper resin layer.

7. An active matrix type liquid crystal display panel as claimed in claim 1, wherein said first shielding film is formed as a two-layered structure consisting of an insulating film and a thin metal film formed on said insulating film to have a thickness of 0.2 to 2 μm.

8. An active matrix type liquid crystal display panel as claimed in claim 1, wherein said first shielding film is formed to overlap said pixel electrode.

9. An active matrix type liquid crystal display panel as claimed in claim 1, wherein said second shielding film is formed of metal, black resin, white resin, or color resin.

10. An active matrix type liquid crystal display panel as claimed in claim 1, wherein said semiconductor region includes two opposing electrodes separated by a gap defined by two edges and said second shielding film further extends past each of said edges by a margin sufficient to account for variations in lamination between said first substrate and said second substrate.

11. An active matrix type liquid crystal display panel as claimed in claim 1, wherein said active device is a field effect transistor, and an opening portion is formed in said first shielding film on an active region of said field effect transistor.

12. An active matrix type liquid crystal display panel as claimed in claim 1, wherein said first shielding film is formed as a laminated structure consisting of a lower resin layer colored with a first color and an upper resin layer colored with a second color excepts for said first color.

13. An active matrix type liquid crystal display panel as claimed in claim 12, wherein said lower resin layer is a white resin layer or black resin layer, and said upper resin layer is a color resin layer.

14. An active matrix type liquid crystal display panel as claimed in claim 12, wherein said upper resin layer is a red resin layer, blue resin layer or green double-layered structure consisting of a dichromatic resin layer including two colors or red, blue, and green which are not included in said upper resin layer.

15. An active matrix type liquid crystal display panel comprising:
    a first substrate having a plurality of active devices, a plurality of scanning bus lines, a plurality of data bus lines, and a plurality of pixel electrodes;
    a second substrate having opposed electrodes on its surface opposing to said first substrate;
    a shielding film formed of a white resin layer or color resin layer formed on top of said active device, and between said pixel electrodes on said first substrate and positioned to cover at least said active devices from light coming in through said second substrate; and
    liquid crystals sealed between said first substrate and second substate.

16. An active matrix type liquid crystal display panel as claimed in claim 15, wherein a black resin layer is formed beneath said, white resin layer, and said shielding film is formed of said white resin layer and said black resin layer.

17. An active matrix type liquid crystal display panel as claimed in claim 15, wherein microparticles of pigment, each having a particle diameter to reflect a particular color light, are scattered in said color resin.

18. An active matrix type liquid crystal display panel as claimed in claim 15, wherein said shielding film made of said color resin is formed as a laminated structure consisting of a lower resin layer colored with a first color and an upper resin layer colored with a second color except for said first color.

19. An active matrix type liquid crystal display panel as claimed. in claim 18, wherein said upper resin layer is a red resin layer, blue resin layer or green resin layer, and said lower resin layer is formed as a double-layered structure consisting of two-color resin layers including two colors of red, blue, and green which are not included in said upper resin layer.

20. An active matrix type liquid crystal display panel as claimed in claim 15, wherein said first shielding film made of said color resin consists of a white or black lower resin layer and an upper color resin layer.

21. An active matrix type liquid crystal display panel as claimed in claim 15, wherein said first shielding film is formed to overlap said pixel electrode by a margin for patterning.

22. An active matrix type liquid crystal display panel comprising:
- a first substrate having a plurality of active devices, a plurality of scanning bus lines, a plurality of data bus lines, and a plurality of pixel electrodes, said active devices and said pixel electrodes being formed in respective intersecting regions between said plurality of scanning bus lines and said plurality of data bus lines;
- a first alignment film rubbed in a first direction to cover said pixel electrodes;
- a second substrate having opposed electrodes on its surface opposing to said first substrate;
- a second alignment film formed on said opposed electrodes on said second substrate to be rubbed in a second direction;
- a first shielding filmed formed on top of said active devices and between said pixel electrodes on said first substrate and positioned to cover at least said active devices from light coming in through said second substrate, for exposing portions of peripheries of said pixel electrodes directing to said first direction and covering portions thereof directing to an opposite direction to said first direction;
- a second shielding film formed in portions of peripheries of said pixel electrodes opposing to regions not covered by said first shielding film on said second substrate; and
- liquid crystals sealed between said first substrate and said second substrate.

23. An active matrix type liquid crystal display panel as claimed in claim 22,wherein said first shielding film is formed between said pixel electrode and said scanning bus line and said data bus line, which being not electrically connected to said pixel electrodes, of two scanning bus lines and two data bus lines surrounding said pixel electrode.

24. An active matrix type liquid crystal display panel as claimed in claim. 22, wherein said first shielding film is formed between said pixel electrode and said scanning bus line of two scanning bus lines sandwiching said pixel electrode, which is not electrically connected to said pixel electrode.

25. An active matrix type liquid crystal display panel as claimed in claim 22, wherein said first shielding film exposes said active devices, and said second shielding film is formed in regions opposing to said active devices.

26. An active matrix type liquid crystal display panel as claimed in claim 22, wherein said second shielding film is formed to oppose to at least part of said active devices.

27. An active matrix type liquid crystal display panel as claimed in claim 22, wherein said first shielding film is formed of black resin, white resin, or color resin.

28. An active matrix type liquid crystal display panel as claimed in claim 22, wherein microparticles of pigment, each having a particle diameter to reflect a particular color light, are scattered in said color resin.

29. An active matrix type liquid crystal display panel as claimed in claim 22, wherein said first shielding film is formed as a two-layered structure consisting of an insulating film and a thin metal film formed on said insulating film to have a thickness of 0.2 to 2 μm.

30. An active matrix type liquid crystal display panel as claimed in claim 22, wherein said second shielding film is formed of metal, black resin, white resin, or color resin.

31. A liquid crystal projector comprising:
- an active matrix type liquid crystal display panel including a first substrate having a plurality of active devices, a plurality of scanning bus lines, a plurality of data bus lines, and a plurality of pixel electrodes, a second substrate having opposed electrodes on its surface opposing to said first substrate, a first shielding film formed on top of said active devices and in areas located between said pixel electrodes on said first substrate and positioned to cover at least said active devices from light coming in through said second substrate, a second shielding film formed in at least areas opposing to semiconductor regions of said active devices on said second substrate, and liquid crystals sealed between said first substrate and said second substrate;
- a light source for irradiating a light into said active matrix type liquid crystal display panel; and
- a screen to which a light being passed through said active matrix type liquid crystal display panel is irradiated.

32. A liquid crystal projector comprising:
- an active matrix type liquid crystal display panel including a first substrate having a plurality of active devices, a plurality of scanning bus lines, a plurality of data bus lines, arid a plurality of pixel electrodes, a second substrate having opposed electrodes on its surface opposing to said first substrate, a first shielding film formed of a white resin layer or color resin formed on top of said active devices and between said pixel electrodes on said first substrate and positioned to cover at least said active devices from light coming in through said second substrate, and liquid crystals sealed between said first substrate and said second substrate;
- a light source for irradiating a light into said active matrix type liquid crystal display panel; and
- a screen to which a light being passed through said active matrix type liquid crystal display panel is irradiated.

33. A liquid crystal projector comprising:
- an active matrix type liquid crystal display panel including a first substrate having a plurality of active devices, a plurality of scanning bus lines, a plurality of data bus lines, and a plurality of pixel electrodes, said active devices and said pixel electrodes being formed in respective intersecting regions between said plurality of scanning bus lines and said plurality of data bus lines, a first alignment film rubbed in a first direction to cover said pixel electrodes, a second substrate having opposed electrodes on its surface opposing to said first substrate, a second alignment film formed on said opposed electrodes on said second substrate to be rubbed in a second direction, a first shielding film formed on top of said active devices and between said pixel electrodes on said first substrate and positioned to cover at least said active devices from light coming in through said second substrate, for exposing portions of peripheries of said pixel electrodes directing to said first direction and covering portions thereof directing to an opposite direction to said first direction, a second shielding film formed in portions of peripheries of said pixel electrodes opposing to regions not covered by said first shielding film on said second substrate, and liquid crystals sealed between said first substrate and said second substrate;

a light source for irradiating a light into said active matrix type liquid crystal display panel; and a screen to which a light being passed through said active matrix type liquid crystal display panel is irradiated.

34. A liquid crystal projector comprising:

a light source for emitting a white light;

an optical mechanism for separating said white light into a plurality of colors; and liquid crystal display panels arranged in every light path through which said plurality of colors are passed, said liquid crystal display panel including
- a first substrate having a plurality of active devices with semiconductor regions, a plurality of scanning bus lines, a plurality of data bus lines, and a plurality of pixel electrodes;
- a second substrate having opposed electrodes on its surface opposing to said first electrodes;
- liquid crystals sealed between said first substrate and said second substrate;
- a first resin shielding film of color identical to irradiated color formed on top of said active devices and in areas located between said pixel electrodes on said first substrate to cover at least said active devices from light coming in through said second substrate; and
- a second resin shielding film of color identical to irradiated color formed in at least areas opposing to said semiconductor regions of said active devices on said second substrate.

* * * * *